United States Patent [19]

Nagatomi et al.

[11] Patent Number: 4,602,132
[45] Date of Patent: Jul. 22, 1986

[54] KEY TELEPHONE SYSTEM

[75] Inventors: Kazuyuki Nagatomi; Rikio Sato, both of Tokyo, Japan

[73] Assignee: NEC Corporation, Tokyo, Japan

[21] Appl. No.: 651,207

[22] Filed: Sep. 17, 1984

[30] Foreign Application Priority Data

Sep. 20, 1983 [JP] Japan .............................. 58-173493

[51] Int. Cl.⁴ ............................................ H04M 5/00
[52] U.S. Cl. ................................. 179/99 R; 179/99 A
[58] Field of Search ................ 179/99 R, 99 A, 99 E, 179/99 H, 99 LC, 99 LS, 99 M, 99 P, 18 AD, 18 ES, 81 R, 37, 18 B, 18 BB, 18 BE

[56] References Cited

U.S. PATENT DOCUMENTS

| | | | |
|---|---|---|---|
| 4,203,011 | 5/1980 | Coviello | 179/99 M |
| 4,277,649 | 7/1981 | Sheinbein | 179/18 B |
| 4,278,844 | 7/1981 | Jones | 179/18 B |
| 4,379,950 | 4/1983 | Ahmed | 179/18 ES |
| 4,453,040 | 6/1984 | Wolf et al. | 179/81 C |
| 4,491,693 | 1/1985 | Sano et al. | 179/99 R |
| 4,517,409 | 5/1985 | Nagasaki | 179/81 C |

OTHER PUBLICATIONS

Dodman, "Vantage 12: A Key Telephone System with Flexible Features", *Telesis*, vol. 1, 1982, pp. 30-37.

Primary Examiner—James L. Dwyer
Attorney, Agent, or Firm—Sughrue, Mion, Zinn, Macpeak & Seas

[57] ABSTRACT

A key telephone system includes a plurality of key telephone stations, at least one of the key telephone stations being of the kind which includes CO buttons for specifying CO/PBX lines and DSS buttons for specifying the intercom designations for the key telephone stations to be interconnected via the intercom lines, and being selectively operable as a control station. The key telephone system also includes a switching network, a switching control unit and a system memory unit, the switching control unit controlling the switching network and key telephone stations in accordance with system data stored in the system memory unit. The system memory unit is provided with memory accessed by operation of DSS and CO buttons when the key telephone system is in the system data set mode. Each DSS button designates at least one memory location dedicated to the key telephone station identified by that DSS button. Each CO button designates a dedicated portion of each of the memory locations, for storing information relative to that CO line. Information relative to a CO line and designated for a particular key telephone station is set into memory by setting the control key telephone station into system data set mode, and operating the DSS button corresponding to the key telephone station to be controlled in accordance with new CO line information and by operating the CO button corresponding to the CO line about which information is to be entered into memory for the designated key telephone station. CO line information, such as ringing assignment and call restriction assignment, is thus written into memory by operating the DSS buttons designating the key telephone stations whose CO line information is to be changed, and the CO buttons to designate the specific CO lines identified for CO line information changes.

1 Claim, 14 Drawing Figures

| MEMORY ADDRESS AND ICM NUMBER | BITS AND CO LINE NUMBER | | | | | |
|---|---|---|---|---|---|---|
| | 1 | 2 | 3 | 4 | 5 | 6 |
| 1 | | | | | | |
| 2 | | | | | | |
| 3 | | E | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | F | | | | |
| 14 | | | | | | |
| 15 | | | | | | |
| 16 | | | | | | |

| MEMORY ADDRESS AND ICM NUMBER | BITS AND CO NUMBER | | | | | |
|---|---|---|---|---|---|---|
| | 1 | 2 | 3 | 4 | 5 | 6 |
| 1 | | | | | | |
| 2 | | | G | | | |
| 3 | | | | | | |
| ⋮ | | | | | | |
| 15 | | | | | | |
| 16 | | | | | | |

206
1. AFTER CHANGE, IMMEDIATELY READ VIA DATA READ/WRITE AND SET IN READ DATA BUFFER.
2. MAKE CORRESPONDING CO LINE LAMP LIT/UNLIT ACCORDING TO CONTENT OF READ DATA BUFFER.
   IF "1" — LIT
   IF "0" — UNLIT (E)

209
1. AFTER CHANGE, IMMEDIATELY READ VIA DATA READ/WRITE BUFFER AND SET IN READ DATA BUFFER.
2. MAKE CORRESPONDING CO LINE LAMP LIT/FLASH/UNLIT ACCORDING TO CONTENT OF READ DATA BUFFER.
   IF "00" — UNLIT
   IF "10" — LIT
   IF "11" — FLASH (F)

| MEMORY ADDRESS AND ICM NUMBER | BITS | | | | | |
|---|---|---|---|---|---|---|
| | 1 | 2 | 3 | 4 | 5 | 6 |
| 1 | 2-1-1 | 2-3-1 | 2-5-1 | 2-7-1 | 2-9-1 | 2-11-1 |
| 2 | 2-1-2 | 2-3-2 | 2-5-2 | 2-7-2 | 2-9-2 | 2-11-2 |
| 3 | 2-1-3 | 2-3-3 | 2-5-3 | 2-7-3 | 2-9-3 | 2-11-3 |
| 4 | 2-1-4 | 2-3-4 | 2-5-4 | 2-7-4 | 2-9-4 | 2-11-4 |
| ⋮ | ⋮ | ⋮ | ⋮ | ⋮ | ⋮ | ⋮ |
| 13 | 2-2-5 | 2-4-5 | 2-6-5 | 2-8-5 | 2-10-5 | 2-12-5 |
| 14 | 2-2-6 | 2-4-6 | 2-6-6 | 2-8-6 | 2-10-6 | 2-12-6 |
| 15 | 2-2-7 | 2-4-7 | 2-6-7 | 2-8-7 | 2-10-7 | 2-12-7 |
| 16 | 2-2-8 | 2-4-8 | 2-6-8 | 2-8-8 | 2-10-8 | 2-12-8 |

KEY TELEPHONE SYSTEM

BACKGROUND OF THE INVENTION

The present invention relates to a key telephone system and, more particularly, to a key telephone system which allows system data to be keyed in from a particular one of a plurality of key telephone stations.

A key telephone system is a customer controlled telephone switching system which is capable of using more than one line by manipulation of service selection pushbuttons, or keys, arranged on a single telephone station set. This kind of system contributes a great deal to efficient utilization of lines within an office.

Figure 1:
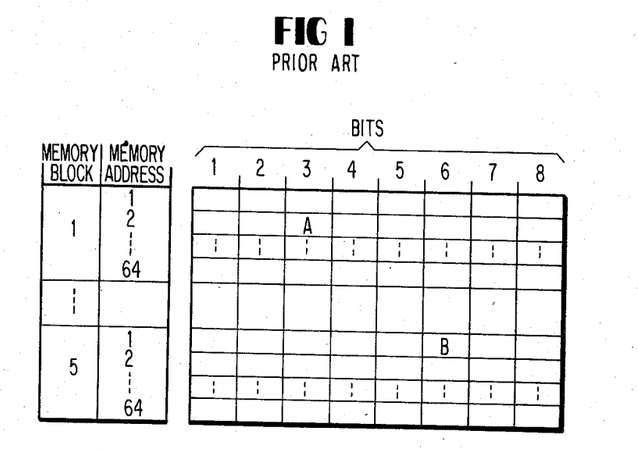
FIG. 1 shows the relationship between memory areas and addresses of a prior art system data memory.
Figure 2:
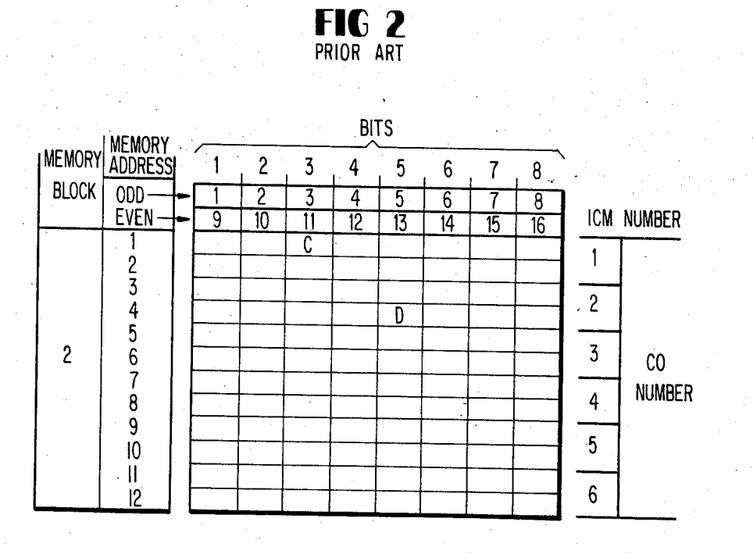
FIG. 2 shows the relationship between memory areas and station set numbers and CO line numbers customarily used for ringing assignment.

Usually, system data for defining system operations of key telephone stations somewhat differ from one office to another. Therefore, at the time of installation of a key telephone system in a certain office, the supplier sets system data by manipulating buttons to meet the particular customer's needs. System data of the kind concerned include a ringing assignment for specifying key station sets which ring upon receipt of calls over respective CO lines, a call restriction assignment for determining whether or not to allow origination of a call to CO lines on each of the key station sets, various timer value assignments used in a key telephone system, and assignments of a paging group, a prime line pick up, an attendant station, a private line, a CO line scan, a door phone, and a door phone chime. A system data memory is divided into blocks each of which is assigned to system data which are as analogous to each other as possible. Each block of the system data memory includes a plurality of 1-byte memories which are accessed by memory addresses (FIG. 1). To set various timer counters, for example, memory block "1" is designated first. Then, if the timer is a hooking timer, memory address "1" is designated to set data associated with the relation between each station set and the timer. Where the timer is a pause timer, memory address "2" will be designated for setting associated data. FIG. 2 represents ringing assignment wherein the number of CO lines is assumed to be six and that of station sets, sixteen. In FIG. 2, memory block "2" is designated and, then, memory address "1" so as to set either "0" or "1" in each of eight bits of the accessed memory address, thereby assigning ringing on the first to eighth station sets for the first CO line. Then, memory address "2" is accessed to set data in respective bits of that address so that a ringing assignment is effected on the nineth to sixteenth station sets for the first CO line. For the second, third, . . . , sixth CO lines, memory addresses "3", "4", "5", "6", . . . , "11", "12", are designated, respectively, and data are set therein.

The above-described manner of memory area allocation, i.e., gathering system data associated with analogous functions in the same block and writing a specific one of the functions by designating a word address, is effective to free the other blocks from being influenced by the writing of the specified one of the functions.

System data are entered by manipulating buttons of one of key station sets which can be switched in a system from the usual operation mode to the system data set mode. The particular key station set used for system data setting is identical with the others concerning the arrangement of buttons on an operation panel; buttons which serve as function buttons in the usual operation mode serve to access the block addresses and memory addresses, for entry of data, etc., in a system data set mode.

Figure 3:
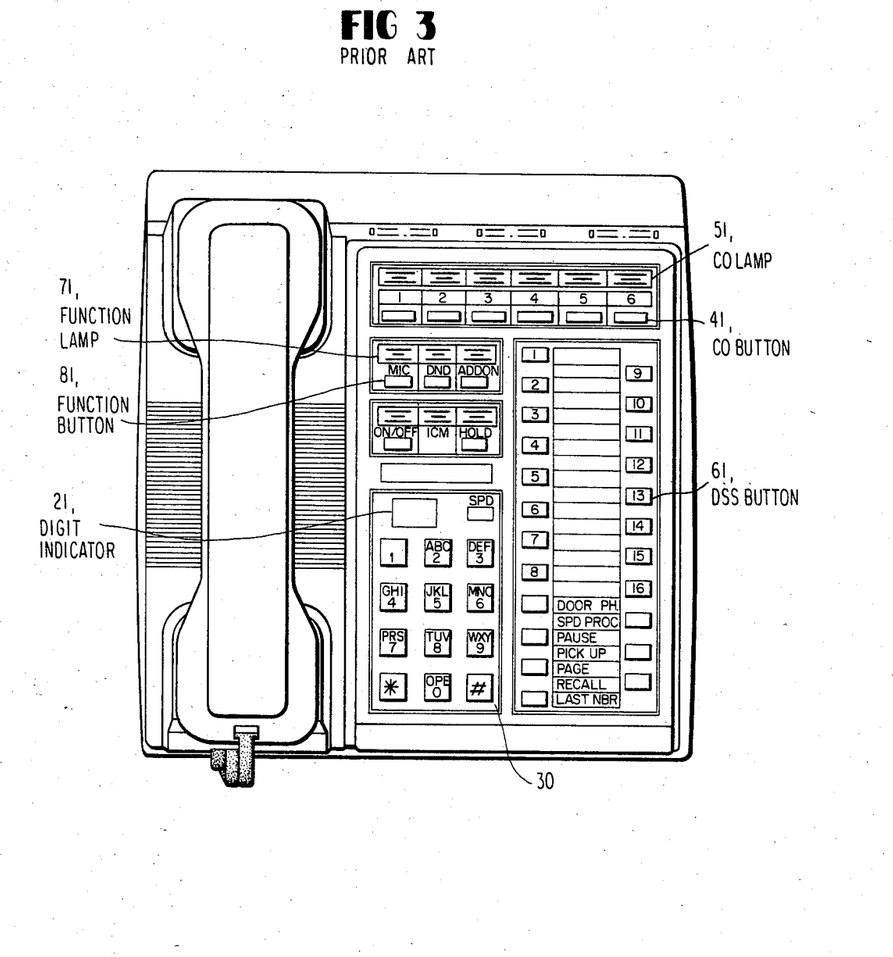
FIG. 3 is a plan view of buttons, lamps, etc. arranged on a panel surface of a key station set.
Figure 4:
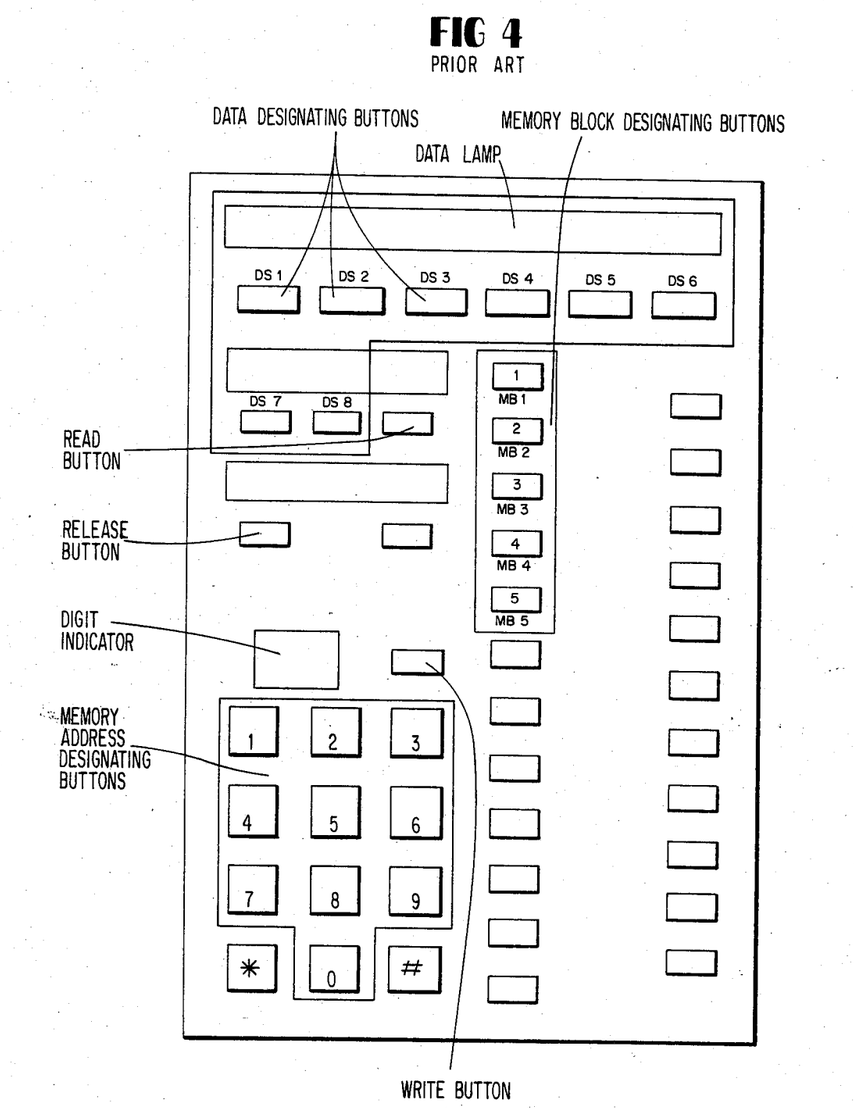
FIG. 4 shows the customary functions of various buttons on the key station set when in a system data set mode.

Referring to FIG. 3, there is shown a key telephone station set provided with various function buttons, dial buttons, CO buttons, DSS (direct station selection) buttons and the like which serve their so named functions in a usual operation mode. In a system data set mode, on the other hand, the buttons fill the roles of function buttons shown in FIG. 4. That is, in FIG. 4, the DSS buttons are used for accessing memory blocks, the dial buttons (ten keys) for accessing memory addresses, and the CO buttons for writing data in each bit of the accessed memory address.

The functions of the respective buttons in the system data set mode have no relation to the functions of these buttons in the usual operation mode. A person in charge of the assignment, therefore, has to manipulate the buttons with accuracy referring to a table which shows the functions of the buttons in the system data set mode, the addresses which are to receive data and the data to be entered at each address. Such work is labor- and time-consuming.

The need for changing the ringing assignment and call restriction assignment often arises in a office due to changes in office layout, and shifts of workers' positions. The difficulty experienced by the customer in changing system data including the ring assignment and call restriction assignment becomes great if the names or labels of buttons in a usual operation mode have no connection with those in a system data set mode as discussed above.

SUMMARY OF THE INVENTION

It is therefore an object of the present invention to provide a key telephone system which facilitates system data writing.

It is another object of the present invention to provide a key telephone system which allows one to readily change system data.

A key telephone system includes a plurality of key telephone stations of a first type, a switching network for connecting the key telephone stations to CO/PBX or intercom telephone lines, and a system control unit for controlling the key telephone stations, the switching network and the like on the basis of system data stored in system data storage. According to the system of the present invention, there is also provided a key telephone station of a second type including first to m-th CO buttons for specifying one of the CO/PBX lines and first to n-th DSS buttons for specifying the key telephone stations of the first type during usual operation mode while, in the system data set mode, the CO buttons and the DSS buttons function as input devices for inputting data which define a system operation. Store means are installed in the system data storage to be accessible in the system set mode, the store means being addressed by manipulation of the DSS buttons to store system data associated with the CO line corresponding to the operated CO button and the key telephone station corresponding to the operated DSS button. Means for writing system data into the store means by manipulation of a CO button and/or a DSS button, is also provided whereby in the usual operation mode the key telephone stations caused to ring in response to receipt of a call over a CO line and/or the origination of a call at the selected key telephone stations are restricted.

In accordance with the present invention, such system data as ringing assignment and call restriction assignment which may need to be changed after installation of the system are written into a memory area accessed by the DSS buttons and the CO buttons, which are kept to designate the same information in the system data set mode. This allows ringing assignment and call restriction assignment to be set up between station sets associated with the DSS buttons and CO lines associated with the CO buttons.

DETAILED DESCRIPTION OF THE PREFERRED EMBODIMENTS

Figure 5:
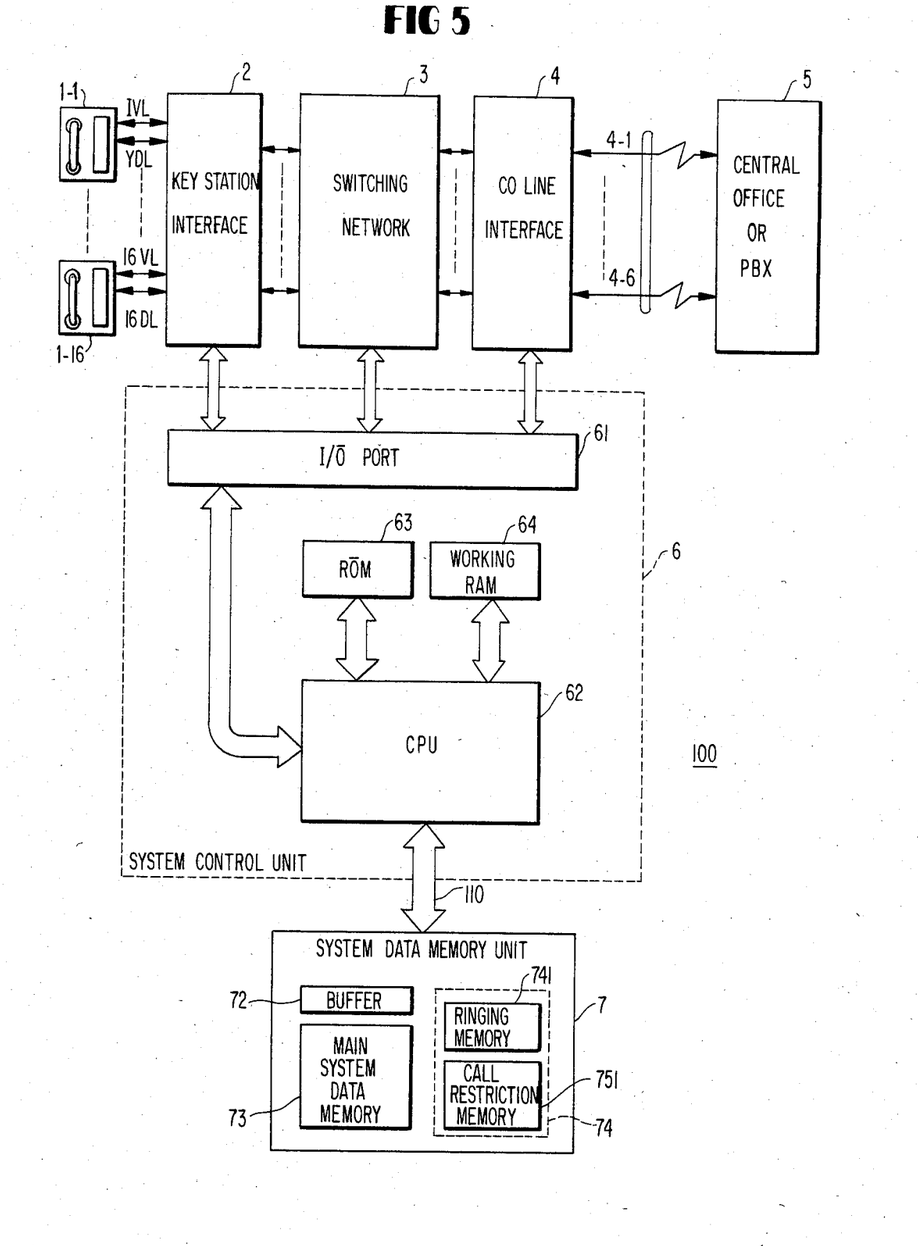
FIG. 5 is a block diagram of a key telephone system embodying the present invention.

Referring to FIG. 5, a key telephone system 100 includes a plurality of key telephone station sets 1-1, . . ., 1-16, a switching network 3, a system control unit 6, and a system data memory unit 7. Voice paths are set up between the key telephone station sets and CO lines 4-1 to 4-6 via voice lines 1VL-16VL, a key station interface 2, the switching network 3, and a CO line interface 4. The key telephone station sets are connected to an input/output (I/O) port 61 of the system control unit 6 by way of data lines 1DL-16DL and the key station interface 2, delivering and receiving data through this route. The CO interface 4 is also connected to the system control unit 6 via the I/O port 61. It is adapted to detect and inform the system control unit 6 of a call and then cause ringing when instructed by the system control unit 6.

The system control unit 6 includes a central processing unit (CPU) 62, a read only memory (ROM) 63 for storing an operation program assigned to the CPU 62, a working random access memory (RAM) 64 for storing various kinds of data during usual operation and system data during operation in the data set mode system, and the I/O port 61. The system control unit 6 controls the switching network 3, key station interface 2, and CO line interface 4 on the basis of the program stored in the ROM 63 and data stored in the system data memory 7.

Referring to FIG. 3 together with FIG. 5, the key telephone station set 1-1 has an operation panel which is provided with dial buttons 30, CO buttons 41, DSS (direct station selection) buttons 61, and off line sequence buttons 81. A display lamp 51 is associated with each of the CO buttons 41, while a display lamp 71 is associated with each of the off line sequence buttons 81. Each of the lamps 51 and 71 is adapted to display statuses of its associated button. In the usual operation mode, a CO call is originated by depressing any one of the CO buttons 41 to pick up a CO line associated therewith, and then manipulating the dial buttons 30. For a DSS call which picks up one of the key telephone station sets involved in the system, any of the DSS buttons 61 associated with a desired station set is or are depressed. By such manipulation, data is fed to the CPU 62 via the I/O port 61 so that the CPU 62 is caused to control the switching network 3, CO interface 4, and key station interface 2 based on the program stored in the ROM 63 and data stored in the system data memory 7. The key station interface 2 delivers lamp on/off data to the respective telephone station sets. Upon receipt of a call, a CO line lamp is caused to flash to urge one to operate the associated CO button to set up connection with the CO line.

The system data memory 7 is made up of a buffer memory 72, a first system data memory 73, and a second system data memory 74. The first system data memory 73 is addressed in a manner shown in FIG. 1. That is, a block is first designated first and, then, a memory address. Data is then written into the bit locations (eight bits) of that address. The illustrated allocation of the memory addresses of the first system data memory 73 has been employed by prior art key telephone systems. In accordance with the present invention, system data which are set at the time of installation of the key telephone system and need no change afterwards are written into the first system data memory 73. Writing and reading data into and out of the memory 73 is effected through an 8-bit buffer memory 72. Meanwhile, system data which need changes after the start of service are stored in the second system data memory 74. This kind of system data include the previously mentioned ringing assignment and call restriction assignment.

The second system data memory 74 comprises a ringing assignment memory 741 and a call restriction assignment memory 751. The memory addresses of the ringing assignment memory 741 are sequentially associated with the numbers of the DSS buttons 61 which respectively designate the key station sets; the respective bits of the memory addresses are associated with the numbers of the CO buttons 41 each of which designates a CO line. Upon receipt of a call over a CO line data written in the memory addresses of memory 741 control the delivery of a ring instruction to the key station sets designated by those memory 741 addresses.

Figure 6:
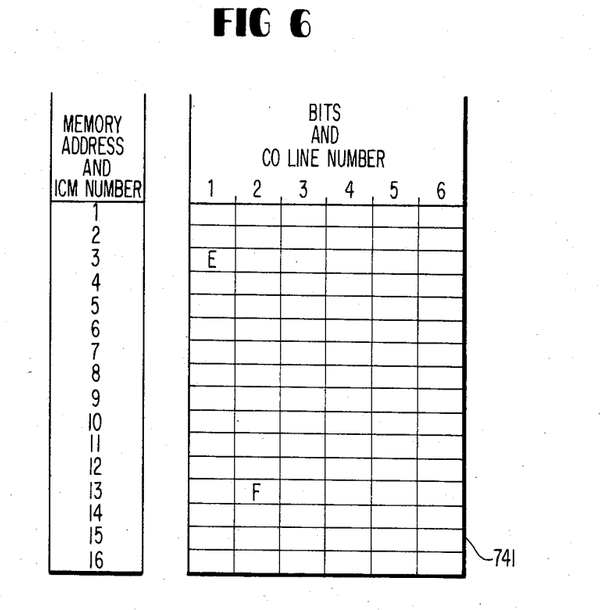
FIG. 6 shows the allocation of the memory areas of a ringing assignment memory included in a second system data memory 74 of the present invention, with row addresses designated in terms of DSS button numbers and bit (columns) addresses in terms of CO button numbers.

FIG. 6 show memory allocations which represent correspondence between the addresses of the ringing assignment memory 741 and bit locations in the respective addresses in terms of DSS numbers and CO line numbers. In FIG. 6, the first to sixth bits are associated with the CO lines 4-1 to 4-6, respectively, and the memory addresses 1-16 to the station sets 1-16, respectively. Therefore, when "1" is written into the intersection of a certain bit column and a certain address row, a station set designated by that address is caused to ring for a CO line designated by that bit.

Figure 7:
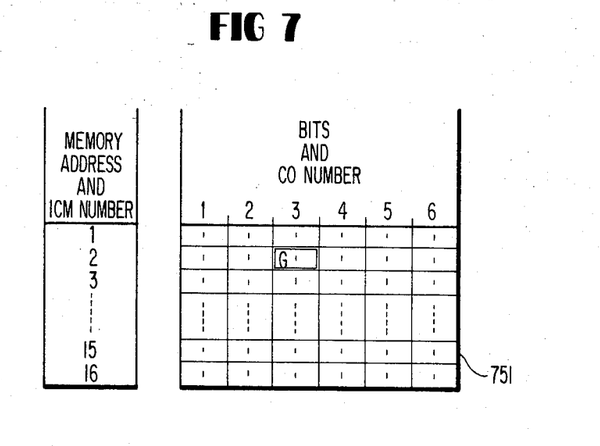
FIG. 7 shows the allocation of memory areas of a call restriction memory.

Next, in FIG. 7, the call restriction assignment memory 751 is provided with memory allocation in which address rows correspond to the station set numbers and columns to the CO line numbers. Each column comprises two bits and effects call restriction on the station sets in accordance with the state of the two bits. For example, concerning calls of a station set number to a CO line 3, a bit code "00" may be written in a memory location G to specify class "AA" which enables origination of all the calls, or a bit code "10" to specify class "AB" which restricts long distance calls inclusive of international calls, a bit code "11" to specify class "BB" which allows receipt of calls but restricts origination of calls.

The ringing assignment and call restriction assignment are effected by operating the DSS buttons and CO buttons in the system data set mode.

Specifically, for the ringing or call restriction assignment, a system data set mode is set up, and then a DSS button and a CO button are manipulated to write address and bit data, thereby setting ringing data or call restriction data associated with a station set designated by the DSS button and a CO line designated by the CO button. This resembles manipulating DSS and CO buttons in the usual (system) operation mode in order to pick up their associated DSS and CO lines and, therefore, allows a customer to perform it with ease. Such convenience is attained by allocating the second system memory such that the functions of the buttons on the panel of a station set in the system data set mode have some relation with those in the usual operation mode.

Figure 8:
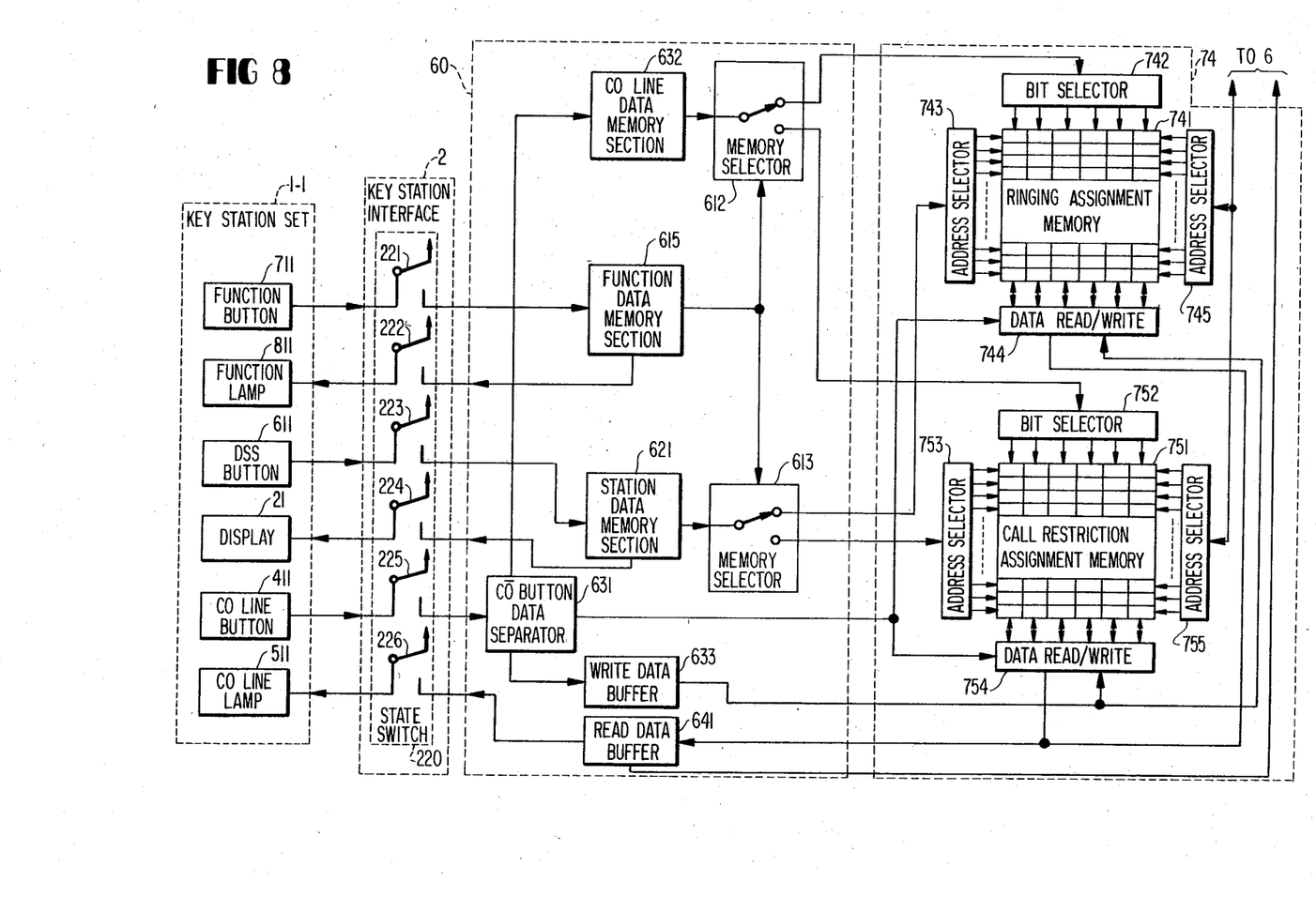
FIG. 8 is a block diagram showing a connection between a key station set 1-1 and the second system data memory 74 when the system is in the data set mode.

FIG. 8 shows the connection of the key station set 1-1 to the second system data memory 74 which is set up when the station set 1-1 is disconnected from the switching network by manipulation of its buttons is thereby set to serve as a system data input/output device. Although the key station set 1-1 and the key station interface 2 in practice are interconnected by a pair of data lines and various data are exchanged therebetween on a time division basis, the data lines in FIG. 8 are represented by six lines for convenience. In the key station set 1-1, a DSS button unit 611, a CO button unit 411 and a CO lamp unit 511 correspond respectively to the buttons 61, 41 and lamps 51 shown in FIG. 3. Each of the units 611 and 411 has, in addition to simple buttons, the ability to generate a code associated with the button number. The CO lamp unit 511 includes a decoder and the like as well as simple lamps. The key station set includes a display device 21 for displaying a pushed DSS button. Further, the key station set includes a function button unit 711 for specifying the kind of system data, and function lamp unit 811 for displaying a status of the function button. Also shown in FIG. 8 is the portion of the key station interface 2 associated with the system data set mode, i.e. state switch 220. In this mode of operation, contacts 221–226 of the state switch 220 are set so that the key station set 1-1 is connected to a block 60 of the system control unit 6 which joins in system data setting.

To better understand the present invention, the block 60 is subdivided into function blocks. In the block 60, memory sections and buffer memories are included in the working RAM and the other sections in the CPU. A function data memory section 615 stores a code originating from manipulation of the function button unit 711 and designating the ringing assignment or the call restriction assignment, and applies its output to memory selectors 612 and 613. The memory section 615 transfers the code to the function lamp unit, causing it to display the ringing assignment or the call restriction assignment. A station data memory section 621 stores a station set number applied thereto from the DSS (direct station selection) button unit 611, while transferring it to the display 21. The number stored in the memory section 621 is fed to address selectors 743 and 753 and latched thereby to serve as an address for accessing their associated memories 741 and 751. As a CO button on the station set is depressed, code data particular to the CO button is fed to a CO button data separator 631 together with key variation data. The separator 631 separates a code for identifying the CO button from the incoming data and delivers the separated code to a CO line data memory section 632. Meanwhile, the separated key variation data is stored in a write data buffer 633. Further, the separator 631 applies a write signal to read/write ports 744 and 754.

Assume that the ringing assignment memory 741 has sixteen addresses common in number to the station sets, and that each of the addresses is made up of eight bits. The address selector 743 selects one address, while a bit selector 742 is capable of selecting six bits common in number to the CO lines. When one address has been selected, all the bit data belonging to that address are read out via the data read/write port 744 and routed therefrom to a read data buffer 641. When the address selector 743 associated with the ringing assignment memory 741 has selected one address and the bit selector 742, one bit, the memory 741 allows data to be written into that bit of the address in a "write" mode via the data read/write port 744. The data written into the specific bit is an inverted version of data from the write data buffer 633 which is outputted from the data read/write port 744. Immediately after the writing of the data, the data read/write port 744 is switched to a "read" mode so that data in all the bits which belong to that address are read out and supplied to the read data buffer 641. In response to the input data, the read data buffer 641 turns on or off each of the CO line lamps.

Meanwhile, let it be assumed that a call restriction assignment memory 751 has sixteen addresses common in number to the station sets, and that each of the addresses designates two words, or sixteen bits. The address selector 753 selects one address at a time, while a bit selector 752 selects two bits at a time, i.e., one of six pairs of bits common in number to the CO lines.

Upon selection of one address, all the bit data belonging to that address are read out and fed to the read data buffer 641. When a pair of bits belonging to one address are selected by the address selector 755 and bit selector 752 is in a "write mode", the restriction assignment memory 751 allows data to be written thereinto via the data read/write port 754. When the data from the write data buffer 633 is "1", the data read/write port 754 rewrites it to "10", "11" or "00" if the present data in the memory 751 is "00", "10" or "11", respectively.

The system data setting operation will be described with reference to FIG. 8 and FIGS. 9a–9d. At the key telephone station set 1-11 (FIG. 3), buttons ADD ON, ON/OFF and SPD PROG are sequentially operated to cause the ON/OFF lamp to flash and, thereby, switch the station set 1-11 to a system data set mode. At this instant, the functions of the various buttons on the panel surface of the station set are changed from those in the usual operation mode to the system data set mode. The above manipulation sets the contacts 221-226 of the key station interface 2 (FIG. 8) to the position required for system data set mode operation. Thereafter, the operation proceeds according to the flowcharts shown in FIGS. 9a-9d.

Figure 9A:
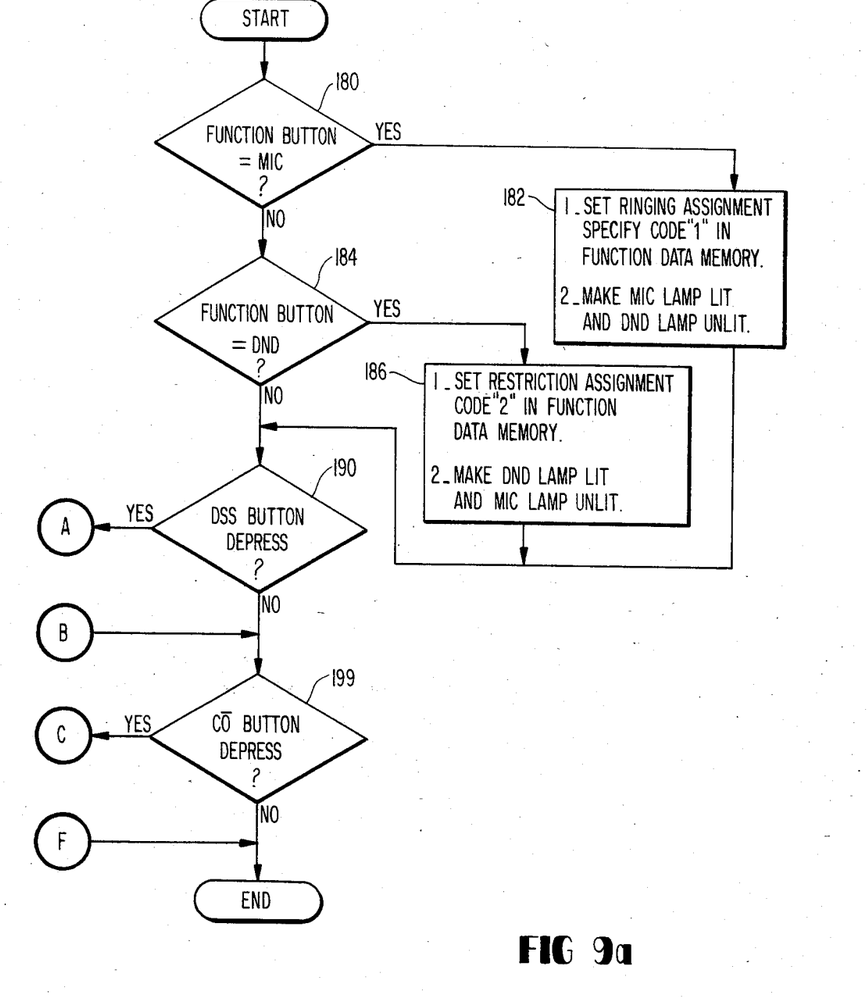
FIGS. 9a-9d are flowcharts demonstrating system operations when in the system data set mode.
Figure 9B:
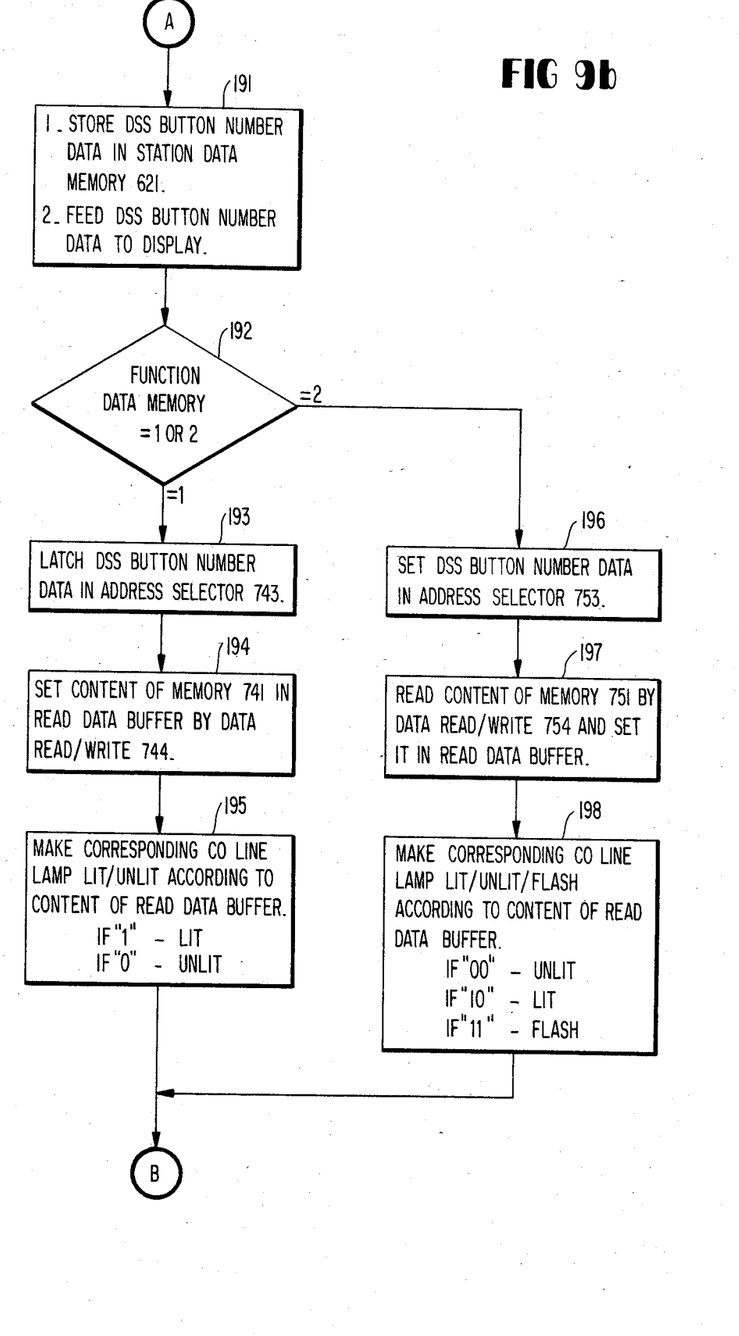
Figure 9C:
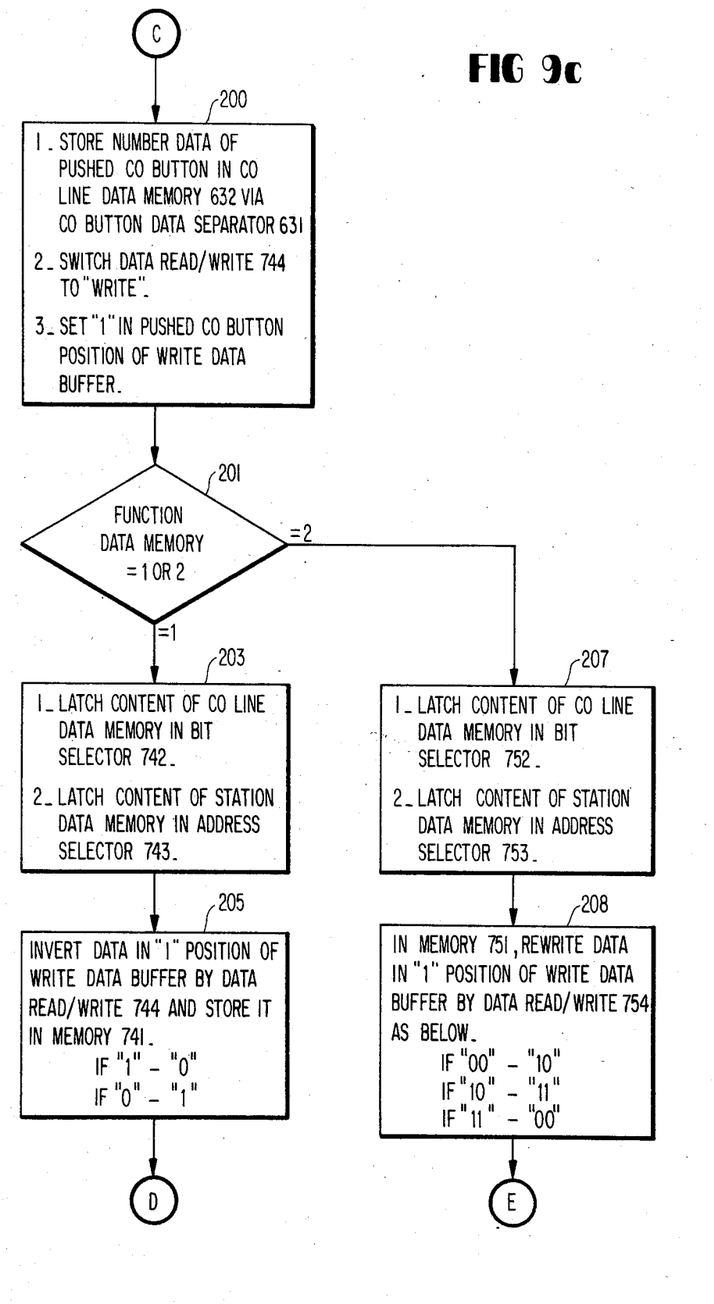
Figure 9D:
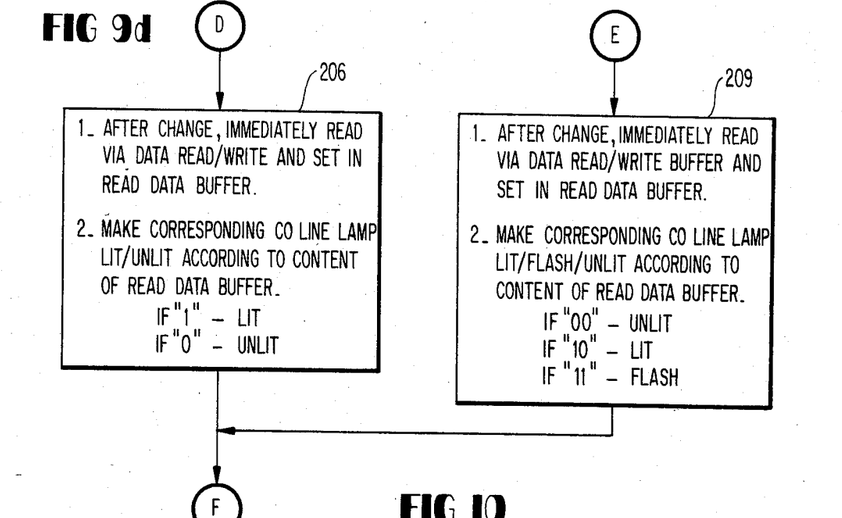

When an MIC button of the function button unit 711 (FIGS. 9 and 3) is operated (step 180), a "1" indicative of ringing assignment is set in the function data memory section 615 so that, among the function lamps 81, an MIC lamp is lit and the DND lamp is unlit (step 182). If it is the DND button of the function button unit 711 which has been operated (step 184), a "2" indicative of call restriction assignment is set in the function data memory section 611 so that the DND lamp is lit and the MIC lamp remains unlit (step 186).

Proceeding with a description of the ringing assignment, the memory selectors 612 and 613 are connected at steps 180 and 182 such that the outputs of the CO data memory section 632 and the station data memory section 615 are coupled to the bit selector 742 and the address selector 743, respectively. When one of the DSS buttons is pushed (step 190), the station data memory section stores number data indicative of the station (e.g. "13") while applying the number data to the display 21 for visible indication of the number (step 191). Since the function data memory 615 has stored "1" therein (step 192), the output of the station data memory 621 is fed to and latched by the address selector 743 to thereby access the thirteenth address of the address selector (step 193). Then, the data read/write port 744 reads out all the bit data belonging to that address, the bit data being routed to the read data buffer 641 (step 194). This causes each of the lamps of the CO lamp unit 511 to be lit or unlit based on the data read out (step 195). The states of the CO lamps display the current status of ringing of the station set 1-13 with respect to each of the CO lines. When it is desired to change the status, e.g., to cancel ringing assignment when the station set 1-13 is currently conditioned to ring upon receipt of a call over the CO line 4-2, the button number "2" associated with the CO line 4-2 of the CO button unit 411 is pushed (step 199). The number "2" and key variation data are applied to and separated by the CO button data separator. The number "2" is fed to the CO data memory 632 to be stored therein, while being routed to and latched by the bit selector 742 (step 200-1). Meanwhile, the variation data is applied to the write data buffer 633 whereby "1" is written into a bit associated with the button number (step 200-3).

When the CO line button has been pushed, the CO button data separator switches the data read/write port 744 to a "write mode" (step 200-2). The address selector 743 and the bit selector 742 respectively latch the DSS button data and the CO button data (step 203). Then, the data read/write port 744 writes into the second bit of the selected address 13 an inverted version of the content of the write data buffer 633 (step 205). Immediately after the writing, the data read/write port 744 is switched to a "read mode" so as to deliver the respective bit data in the address 13 to the read data buffer 641. The buffer 641 supplies the CO lamp unit 511 with the varied data so that a CO lamp corresponding to the CO line 4-2 is unlit. In this manner, system data associated with the ringing relation between each station set and the CO lines can be set or changed according to the various steps of the flowchart. Since the decision steps 180, 184, 190 and 199 in FIG. 9a are adapted to decide key data variation, once a CO line is depressed and the variation is stored in the memory, the stored content does not change unless a key variation is made. Therefore, if another CO button is operated for the same DSS button, what is required for the variation of data corresponding to that CO button is simply operating the CO button according to the flow of FIGS. 9a-9d. After the system data associated with the desired ringing assignment has been written, the flashing ON/OFF button is manipulated to remove the system from the data set mode. This breaks each contact of the key station interface 2 and connects the key station set to the switching network 3 and system control unit 6 via the key station interface 2 whereby the key station set then operates in the system operation mode.

For call restriction assignment the buttons ADD ON, ON/OFF and SPD PROG are sequentially operated to cause the ON/OFF lamp to flash, setting up a system data set mode. Then, the DND button is operated (step 184) to set in the function data memory section 615 "2" which indicates call restriction assignment, the DND lamp then being lit (step 186).

The memory selector 612 couples the output of the CO line data memory section 632 to the bit selector 752, while the memory selector 613 couples the output of the station data memory section 621 to the address selector 753. The station number selected by the DSS button operation, such as "2", is applied from the DSS button unit 611 to the station data memory section 621 to be stored therein. The number is transferred to the display 21 to appear thereon (step 191). At the same time, the number "2" is delivered from the station data memory section 621 to the address selector 753 via the selector 613 and latched therein to access the address 2 of the memory 751 (step 197). The data read/write port 754 loads the read data buffer 641 with all the bit data belonging to the address 2. Then, based on the content of the read data buffer 641, CO line lamps associated with the bit pairs are lit, unlit or caused to flash; unlit if 2-bit data is "00", lit if it is "10", and caused to flash if it is "11" (step 198).

Upon depression of a CO button, data representative of its number such as "3" is separated by the CO button data separator 631 to be stored in the CO line data memory section 631 (step 200-1). Then, the data read/write port 754 is switched to a write mode (step 200-2). In the write data buffer 633, "1" is written into a specific bit which is associated with the pushed CO button (step 200-3). The address selector 753 latches the DSS button number and the bit selector 752 the CO button number (step 207), thereby accessing the third bit pair in the address 2. The data read/write port 754 writes the data in the third bit into the memory area (step 208). Immediately after the variation, the data read/write port 754 reads out the data and loads it in the read data buffer 641. Based on the data in the read data buffer 641, a corresponding CO line lamp is lit, unlit or caused to flash (step 209). By repeating the above procedure, system data for call restriction associated with the CO lines can be written on a station set basis. While the ON/OFF lamp is flashing, it is operated to cancel the system data set mode so that the station set comes to function as a usual telephone station set.

The system data set in the above-described manner is accessed by an address signal fed from the CPU of the system control unit to the address selector 745 or 755, then delivered to the read data buffer via the data read/write port 744 or 754, and then fetched into the working RAM 64.

A second embodiment of the present invention will be described hereinafter.

In the first embodiment, system data which need variation after the installation of the key telephone system are written into an exclusive memory which can be addressed by DSS buttons and CO buttons. In the second embodiment, in contrast, all the system data are designated in terms of memory blocks, word addresses and bits as has been customary, so that system data are written into the bits of a memory area which are designated by the blocks and addresses. However, the system data memory unit 7 stores contrastive conversion tables as well as the system data memory.

Figures 10, 11:
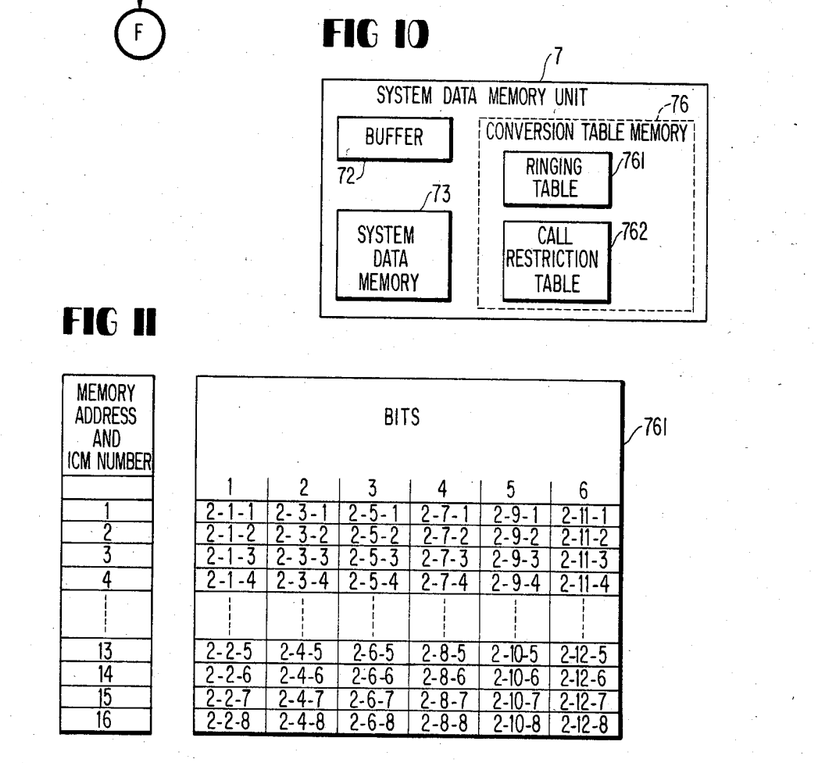
FIG. 10 is a block diagram of the system data memory unit of a second embodiment of the present invention.
FIG. 11 shows exemplary allocation of memory areas of a contrastive conversion table used with the second embodiment.

Referring to FIG. 10, the system data memory unit 7 comprises a buffer memory 72, a system data memory 73, and a contrastive conversion memory 76. The contrastive conversion memory 76 is made up of a table 761 for ringing assignment, and a table 762 for call restriction assignment.

As shown in FIG. 11, the ringing assignment table 761 has rows associated with the station set numbers and colums associated with CO line numbers. The memory area designated by rows and columns have stored the memory blocks, memory addresses, and the numbers of bit positions of the system data memory 73. To vary system data, a system data set mode is set up, then the MIC button is depressed, then a DSS button such as 13 is pushed, and then a CO button such as 2 is pushed. In this situation, block 2, address 4, and bit 5 of the system data memory will be accessed based on the table data 2.4.5 to write alternative data therein, thereby effecting ringing assignment to the station set 13 for the CO line 2.

What is claimed is:

1. In a key telephone system which includes a plurality of key telephone stations, a switching network for connecting the key telephone stations to CO lines or intercom lines, a system control unit, and a system data memory unit, said system control unit operating in response to stored data for controlling the operation of the key telephone stations and the switching control unit, at least one of the key telephone stations having CO buttons for specifying CO lines and DSS buttons for specifying the intercom designations for the key telephone stations, and being selectively operable as a control key telephone station, the improvement comprising:

memory means, comprised of a first system data memory and a second system data memory, for storing CO line related information for said plurality of key telephone stations, said memory means being a part of said system data memory unit which further includes a main system data memory; and means, responsive to the operation of said DSS buttons and said CO buttons, for accessing said memory means at locations storing CO line related information for the intercom stations designated by the operated DSS buttons;

wherein said key telephone system operating as a control station further includes function buttons and means responsive to said function buttons for causing said control key telephone to switch between the usual operation mode and a system data set mode wherein first system data or second system data are set into said first system data memory and said second system data memory, respectively in response to the operation of said function buttons;

wherein said system control unit includes:

function data memory means storing the data set function designated by the operation of said function buttons;

station data memory means for storing a designation of a key telephone station specified by the operation of a DSS button;

CO button data separator means responsive to the operation of a CO button, for signaling CO designation of the operated CO button and for signaling other information relative to the operated CO button;

CO line data memory means, responsive to the output from said CO button data separator means, for storing a designation of a CO line specified by the operation of a CO button;

first memory selector means for selectively transferring the contents of said CO line data memory means to said first system data memory or said second system data memory;

second memory selector means for selectively transferring the contents of said station data memory means to first system data memory or second system data memory;

write data buffer means for storing said other information signaled by said CO button data separator; and read data buffer means, for storing system data read from said first or second system data memory means; and wherein each of said first and second system data memory means includes a memory array for storing system data relative to each CO line for each key telephone station, row address selector means responsive to the output of said second memory selector means for designating a row address corresponding to the key telephone station designatd by the operated DSS button, bit address selector means responsive to the output of said first memory selector means for designating bit addresses corresponding to the CO line designated by the operated CO button, and data read/write means for reading data from said memory array to said read data buffer means and for writing data in said write data buffer means into said memory array at memory locations addressed by said row and bit address selector means.

* * * * *

UNITED STATES PATENT AND TRADEMARK OFFICE
CERTIFICATE OF CORRECTION

PATENT NO. : 4,602,132
DATED : July 22, 1986
INVENTOR(S) : Kazuyuki NAGATOMI et al It is certified that error appears in the above-identified patent and that said Letters Patent is hereby corrected as shown below:

Column 2, Line 27, after "data", insert --,--.

Column 2, Line 28, after "assignment", insert --,--.

Column 3, Line 5, after "mode", insert --and the usual operation mode--.

Column 3, Line 66, after "the", insert --system--;
after "mode", delete "system".

Column 4, Line 32, after "designated", delete "first".

Column 4, Line 60, delete "show", and insert therefor --shows--.

Column 5, Line 37, after "buttons", insert --and--.

Signed and Sealed this

Tenth Day of February, 1987

*Attest:*

DONALD J. QUIGG

*Attesting Officer*  *Commissioner of Patents and Trademarks*